United States Patent Office 3,538,191
Patented Nov. 3, 1970

3,538,191
PROCESS FOR PREPARING IMPROVED PLASTIC COMPOSITIONS AND THE RESULTING PRODUCTS
Curtis L. Meredith, Robert E. Barrett, and William A. Bishop, Sr., Baton Rouge, La., assignors to Copolymer Rubber & Chemical Corporation, a corporation of Louisiana
No Drawing. Filed Mar. 30, 1967, Ser. No. 626,930
Int. Cl. C08f 15/40
U.S. Cl. 260—878       20 Claims

ABSTRACT OF THE DISCLOSURE

Plastics having improved impact resistance are prepared by interpolymerizing a mixture including a rubbery polymer and an alkenyl aromatic monomer such as styrene, or a mixture thereof with an acrylic monomer such as acrylonitrile, in an organic solvent for the rubbery polymer and in the presence of a free radical catalyst. Novel impact resistant plastic compositions also are provided, in which the rubbery polymer content is an interpolymer of ethylene, at least one alpha monoolefin containing 3–16 carbon atoms, and a 5-alkylidene-2-norbornene such as 5-ethylidene-2-norbornene.

This invention broadly relates to the preparation of plastics having improved impact resistance. The invention further relates to novel high impact plastic compositions containing a specific rubbery polymer which imparts improved properties.

A wide variety of processes have been proposed heretofore for preparing high impact or gum plastic compositions, which are referred to herein as being rubber modified plastics. The most commonly used commercial process involves a number of steps, reactions, and treating vessels including preparing a hard and durable styrene-acrylonitrile resin which is brittle and has low impact resistance, preparing in another reaction vessel a highly unsaturated elastomer such as polybutadiene which is capable of absorbing shock, thereafter improving the compatibility of the elastomer with the styrene-acrylonitrile resin by grafting monomeric styrene and acrylonitrile thereon, and then blending the styrene-acrylonitrile resin with the grafted elastomer in proportions to arrive at a product which has useful physical properties. Often the prior art process failed to produce a rubber modified plastic having optimum properties in all respects, including impact resistance, tensile strength and hardness.

A simplified process for the preparation of rubber modified-plastics in which the resinous polymer and the grafted rubbery polymer are prepared simultaneously from the resin-forming monomer or monomers and the ungrafted rubbery polymer would be highly desirable. Such a process could be carried out in a single reaction vessel and other reactions or blending steps would not be necessary. However, an entirely satisfactory one-step process was not available prior to the present invention.

It is an object of the present invention to provide a novel polymerization process for the preparation of rubber modified plastics in which the resinous polymer and the rubbery polymer grafted with resin-forming monomers may be prepared simultaneously.

It is still a further object to provide rubber modified plastics having improved properties.

Still other objects and advantages of the invention will be apparent to those skilled in the art upon reference to the following detailed description and the examples.

In practicing the present invention, rubber modified plastic compositions are prepared by interpolymerizing a rubbery polymer and one or more alkenyl aromatic monomers and/or one or more acrylic monomers, in an organic solvent for the rubbery polymer, and in the presence of a free radical catalyst. It is understood that there are certain preferred variants which produce improved results, as will be described more fully hereinafter.

The organic solvent that is selected must be a solvent for the rubbery polymer. Examples of suitable solvents include aromatic hydrocarbons such as benzene, benzene substituted with one or more alkyl groups containing 1–4 carbon atoms such as toluene, dimethylbenzene, xylene and their higher homologs, naphthalene, naphthalene substituted with one or more alkyl groups containing 1–4 carbon atoms such as alpha-methyl or beta-methyl naphthalene and their higher homologs, paraffin and cycloparaffin hydrocarbons containing 5–15 carbon atoms, and preferably 6–10 carbon atoms, such as pentane, n-hexane, 3-methylpentane, 2-methylpentane, 2,2- and 2,4-dimethylpentane, heptane, cyclopentane, cyclohexane, and alkyl substituted cyclopentanes and cyclohexanes wherein the alkyl group or groups contain 1-4 carbon atoms, including methyl cyclopentane, methyl cyclohexane and their homolgos, The halogenated derivatives of the above solvents may be employed, and especially the chlorine and bromine derivatives. Chlorobenzene is very useful as a solvent.

Mixtures containing two or more of the foregoing solvents may be used, and are preferred in many instances. Examples of solvent mixtures which give unusually good results include an aromatic component such as benzene and/or toluene, and a paraffin or cycloparaffin hydrocarbon component containing six through eight carbon atoms such as n-hexane, 3-methylpentane, 2-methylpentane, n-heptane, methyl hexanes, n-octane, methyl octanes, methylcyclopentane, and/or cyclohexane.

Usually better results are obtained when the above solvent mixtures contain about 40–60% by weight of the aromatic solvent component, and about 60–40% by weight of the paraffin or cycloparaffin hydrocarbon component. Best results are usually obtained when about 50% by weight of each component is present.

The alkenyl aromatic monomers which may be used in practicing the present invention include alkenyl aromatic hydrocarbons containing 8–20 carbon atoms and their halogenated derivatives. Specific examples include styrene, chlorostyrene, alpha-alkyl styrenes wherein the alkyl group contains 1–8 carbon atoms such as alpha-methyl styrene, alpha-chloro styrene, vinyl naphthalene, alkyl substituted vinyl naphthalenes wherein the alkyl group or groups contain 1–8 carbon atoms, and halogen substituted vinyl naphthalenes. Styrene is preferred in most instances, and the invention is especially useful for the preparation of high impact polystyrene.

The acrylic monomers which may be used in practicing the invention have the general formula

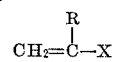

wherein R is selected from the group consisting of hydrogen and alkyl groups having 1–5 carbon atoms, and X is selected from the group consisting of

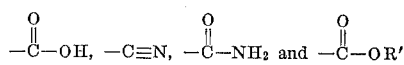

wherein R' is an alkyl group containing 1–9 carbon atoms. Examples of specific acrylic monomers which are especially useful include acrylonitrile, acrylamide, methyl or ethyl acrylonitrile, and acrylic, methacrylic, and ethacrylic acid and the methyl, ethyl, propyl and isopropyl esters thereof. Acrylonitrile is usually the preferred acrylic monomer.

When a mixture of one or more of the alkenyl aromatic monomers and one or more of the acrylic monomers is employed, preferably the ratio by weight of alkenyl aromatic monomer to acrylic monomer is at least 1.5:1, and between 2:1 and 4:1 for better results. The optimum properties are obtained in many instances with styrene and acrylonitrile at ratios by weight of 72:28 to 78:22, or about 3:1. The preferred monomers for use in preparing the monomer mixtures are usually styrene and acrylonitrile.

The rubbery polymers which may be used in practicing the present invention include those used in prior art processes for preparing high impact polystyrene or styrene-acrylonitrile plastics. Examples of highly unsaturated or diene rubbers include those prepared by homopolymerizing the various 1,3-butadienes, such as 1,3-butadiene, 2-methylbutadiene-1, 3, piperylene, and 2,3-dimethylbutadiene-1,3. Rubbery interpolymers of the 1,3-butadienes and one or more monomers interpolymerizable therewith may be used. Examples include interpolymers prepared from monomeric mixtures containing the aforementioned 1,3-butadienes and up to 50% by weight, or more in some instances, of an ethylenically unsaturated compound which contains a $CH_2=C=$ group, wherein at least one of the disconnected valences is attached to an electroactive group which substantially increases the polar character of the molecule. Examples of compounds copolymerizable with the 1,3-butadienes are the aryl olefins such as styrene alpha-methyl styrene and vinyl naphthalene, the alpha-methylenecarboxylic acids and their esters, nitriles and amides, such as acrylic acid, methylacrylate, methylmethacrylate, acrylonitrile, methylacrylonitrile and methylacrylamide. Specific examples of diene rubbers which are especially preferred include the styrene-butadiene rubbers containing less than 50% by weight of bound styrene, the various polybutadiene and polyisoprene synthetic rubbers including the high cis-1,4-and high trans-1,4- stereoisomers and polymers containing mixtures thereof, and the acrylonitrile-butadiene rubbers. Natural rubber also may be used.

Certain synthetic elastomers characterized by a relatively low level of unsaturation are often preferred as the high impact plastic compositions prepared therefrom have markedly higher oxidation resistance and better weathering properties. Also, much less antioxidant may be used, or it may be eliminated in some instances, and this reduces the cost of manufacture and aids in keeping the nonpolymer content at a minimum. Examples of rubbery polymers having a low level of unsaturation include the rubbery interpolymers of ethylene and at least one alpha monoolefin containing 3–16 carbon atoms, rubbery interpolymers of ethylene and at least one polyene, rubbery interpolymers of ethylene, at least one alpha monoolefin containing 3–16 carbon atoms and at least one polyene, and rubbery interpolymers of isobutene and at least one polyene. Specific examples of rubbers having low unsaturation include ethylene-propylene rubbery copolymers, ethylene-propylene-diene rubbery interpolymers, and butyl rubber. Commercial butyl rubber is usually a copolymer of isobutene and approximately 1–5% by weight, and preferably about 2% by weight of isoprene. With the exception of butyl rubber, the preferred polyene in the above rubbery polymers is usually a nonconjugated diene.

The preparation and properties of the foregoing rubbers are well known and are described in a large number of issued United States patents and other publications, including the following: Introduction to Rubber Technology, edited by M. Morton, Reinhold Publishing Corporation, New York (1959); Synthetic Rubber Technology, vol. I, by W. S. Penn, Maclaren and Sons, Ltd., London (1960); Rubber, Fundamentals of Its Science and Technology, J. Le Bras, Chemical Publishing Company, Inc., New York (1957); and Linear and Stereoregular Addition Polymers, N. G. Gaylord et al., Interscience Publishers, New York (1959). Typical commercially available elastomers of the foregoing types are described in the text "Compounding Ingredients for Rubbers," 3rd edition, Cuneo Press of New England, Cambridge, Mass. The above publications are incorporated herein by reference.

The preferred elastomers having low unsaturation are products resulting from interpolymerizing a monomeric mixture containing 10–90 mole percent of ethylene, 10–90 mole percent of at least one other straight chain alpha monoolefin containing 3–16 carbon atoms which preferably is propylene, and 0.1–10 mole percent of a polyunsaturated bridged-ring hydrocarbon having at least one carbon-to-carbon double bond in a bridged ring, in solution in hexane or other organic polymerization solvent, and in the presence of a catalyst prepared from vanadium oxytrichloride and methyl or ethyl aluminum sesquichloride or other suitable Ziegler catalyst. Rubbery copolymers of ethylene and propylene, and rubbery terpolymers of ethylene, propylene and an open chain nonconjugated diene are also useful. The preparation of the above rubbery polymers is disclosed in United States patents such as 2,933,480, 3,093,620, 3,093,621, 3,211,709, 3,113,115 and 3,300,459 the teachings of which are incorporated herein by reference.

It is preferred that the elastomers having low unsaturation be prepared from a monomeric mixture containing ethylene propylene and the polyunsaturated bridged-ring hydrocarbon, in proportions to produce a polymer having good elastomeric properties and an unsaturation level of at least 2 carbon-to-carbon double bonds per thousand carbon atoms in the polymer. For example, the elastomer may contain chemically bound therein molar ratios of ethylene to propylene varying between about 80:20 and 20:80, and between 70:30 and 55:45 for better results. The bridged-ring hydrocarbon may be chemically bound therein in an amount to provide an unsaturation level of 2–25, and preferably about 3–16 carbon-to-carbon double bonds per thousand carbon atoms in the polymer.

Examples of the bridged ring hydrocarbons include the polyunsaturated derivatives of bicyclo-(2,2,1)-heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbons atoms and preferably 3–10 carbon atoms. Other bridge-ring hydrocarbons include polyunsaturated derivatives of bicyclo-(2,2,2)-octane as represented by bicyclo(2,2,2)octa-2,5-diene, polyunsaturated derivatives of bicyclo (3,2,1)-octane, poly-unsaturated derivatives of bicyclo(3,3,1)-nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged ring compounds include 5-methylene-2-norbornene, 5-ethylidene-2-norbornene, 5-isopropylene-2-norbornene, dicyclopentadiene, the methyl butenyl norbornenes such as 5-(2-methyl-2-butenyl)-2-norbornene, or 5-(3-methyl-2-butenyl)-2-norbornene and 5-(3,5-dimethyl-4-hexenyl)-2-norbornene. The elastomers prepared from ethylene, at least one monoolefin containing 3–16 carbon atoms, and the 5-alkylidene-2-norbornenes, wherein the alkylidene group contains 1–20 and preferably 1–8 carbon atoms, produce novel rubber modified plastics which have exceptional properties. The elastomer prepared from 5-ethylidene-2-norbornene is much preferred as it has outstanding properties and produces many unusual and unexpected results when used as the elastomer in the plastic compositions of the invention. As a result, this elastomer is in a class by itself.

In instances where an elastomer is employed which has no unsaturation or very little unsaturation, then it is often desirable to prepare a hydroperoxide thereof by oxidation prior to the polymerization step of the present invention. The oxidation may be in accordance with prior art practice, such as by heating a solution of the elastomer in the presence of molecular oxygen and an organic peroxide or hydroperoxide as a catalyst. In one suitable method, the elastomer is dissolved in a mixture of benzene and hexane, and benzoyl peroxide is added as a catalyst for the oxidation. The reaction vessel is pressurized to 50 p.s.i. with oxygen and maintained at 70° C. for 0.5 to 8 hours. Oxidation can also be affected without a free radical catalyst by reacting for 2 to 10 hours. The resin monomers are added to the solution of the oxidized rubber, with or without adding an additional free radical catalyst, and polymerized to form a rubber modified plastic according to the present invention. The hydroperoxide groups may alone act as the free radical catalyst for the monomer polymerization. It is understood that the elastomer may be oxidized to form hydroperoxide groups thereon whenever there is difficulty in reacting the elastomer substrate with the graft monomer or monomers in the desired amounts to thereby achieve greater ease of grafting.

A wide variety of free radical polymerization catalysts may be employed, including those used in the prior art processes for preparing high impact polystyrene and styrene-acrylonitrile plastics. In some instances, the hydroperoxide groups that are formed by oxidation of the rubbery component may act as the free radical catalyst. Examples of free radical polymerization catalysts include the organic peroxides such as benzoyl peroxide, lauroyl peroxide, propinoyl peroxide, 2-4-dichlorobenzoyl peroxide, acetyl peroxide, tertiary butyl hydroperoxide, tertiary butyl perbenzoate, tertiary butyl peroxisobutyrate, and dicumylperoxide. Mixtures of one or more peroxides may be employed. Additionally, mixtures of one or more peroxides with azo-bisdiisobutyronitrile give better results in some instances, and especially where a less active catalyst is effective. For example, when using the highly unsaturated diene rubbers, or rubbers of low or high unsaturation that have been subjected to an oxidation step to form hydroperoxide groups thereon, then a less active free radical catalyst should be used for optimum results. The catalyst mixture may contain 25–75% and preferably about 50% by weight of the azo-bisdiisobutyronitrile, and 75–25%, and preferably about 50% by weight, of one or more of the above organic peroxides. In instances where an unoxidized elastomer is used having a low degree of unsaturation, then it is desirable to employ a highly active free radical initiator, e.g., a prior art initiator which is known to abstract hydrogen from the elastomer and rapidly catalyze the graft reaction. Many examples of such highly active free radical initiators are known, such as benzoyl peroxide.

The amount of the alkenyl aromatic monomer and/or the acrylic monomer that is grafted on the elastomer during the polymerization step should be sufficient to render it compatible with the resin that is formed simultaneously. For example, the resin-forming monomer or monomers may be grafted on the elastomer in an amount to provide a ratio by weight of the grafted monomeric material to the elastomer between 1:4 and 4:1, and preferably between 1:4 and 2:1. The best results are usually obtained when about 30–120 parts by weight of the resin-forming monomer or monomers are grafted on each 100 parts by weight of the rubbery polymer.

The reaction mixture to be polymerized should contain about 1–50 parts by weight, and preferably 4–25 parts by weight, of the rubbery polymer for each 99–50 parts by weight, and preferably 96–75 parts by weight, of the alkenyl aromatic monomer and/or the acrylic monomer. The monomeric material may be one or more alkenyl aromatic monomers, or one or more acrylic monomers, or a mixture thereof in the ratios previously mentioned. The reaction mixture also should contain about 0.25–2.5 parts by weight, and preferably 0.5–1.3 to 0.75–1.1 parts by weight of the free radical catalyst or initiator for each 100 parts by weight of resin-forming monomer or monomers. Additionally, much better results are achieved when the organic solvent content of the reaction mixture is varied between about 50% by weight of the total weight of the reaction mixture at the lower limit of the rubbery polymer content mentioned above, and 90% by weight thereof when the upper rubbery polymer limit is used. When the preferred rubbery polymer range mentioned above is used, i.e., 4–25% by weight, then the solvent should be present in an amount of about 85–60% by weight of the total reaction mixture.

The temperature of the polymerization may vary over wide ranges. For instance, reaction temperatures of approximately 40–150° C., and preferably about 60–80° C. are usually satisfactory. The polymerization is continued for a sufficient period of time to assure a desired percent conversion of the monomer or monomers. This will vary somewhat with the specific catalyst, solvent, rubbery polymer, monomers, and reaction temperature that are employed. However, reaction times of about 8–24 hours are usually satisfactory. In any event, preferably the reaction is continued until at least 60% by weight of the monomeric material initially present has been converted to polymer, and for best results 95–100% by weight.

The reaction mixture also may contain a cross-linking agent, i.e., a compound containing at least two reactive sites such as two or more ethylenic double bonds. Examples of crosslinking agents are divinylbenzene, divinyl ether of diethylene glycol, triallylcyanurate, and 1,3-butylene-dimethacrylate. The crosslinking agent may be added in an amount of, for example, 0.005–1.0 part by weight, and preferably about 0.01 to 0.5 part by weight, per 100 parts by weight of the monomeric material to be polymerized. Still other types of crosslinking agents may be employed as it is only necessary that it have two or more reactive sites under the conditions of the polymerization.

The reaction mixture may be agitated during the polymerization but vigorous agitation is not necessary. As the polymerization proceeds, the resinous polymer that is formed generally precipitates in a finely dispersed form and remains suspended in the reaction mixture. The rubbery polymer generally remains dissolved in the solution after it has been grafted with the resin-forming monomers. Thus, the polymerization may produce simultaneously one or more resinous homopolymers of the monomer or monomers present, a resinous interpolymer when two or more resin-forming monomers are present, and the rubbery polymer grafted with one or more of the resin-forming monomer or monomers. As a result, at the end of the polymerization the reaction mixture contains all of the components that are needed for a high impact plastic composition, and it is only necessary to recover the products of the polymerization therefrom.

The plastic composition may be recovered from the reaction mixture by coagulation with a lower alcohol such as methyl, ethyl or isopropyl alcohol, or by flashing off the solvent. When the product is recovered by flashing the solvent, preferably the reaction mixture is passed into a vessel containing boiling water. Steam is supplied to the vessel and the solvent evaporates and is removed overhead as a vapor, together with any free monomer content. The plastic product is recovered as a solid in particulate form, and it may be dewatered, washed in water to remove water soluble impurities, and dried in a prior art oven at 50–100° C. until the water content is removed. Fluidized bed drying at 50–100° C. also may be used in most instances with good results. The dried plastic composition may be pelletized or formed into other desirable shapes suitable for marketing.

Prior art antioxidants, processing aids, and other compounding ingredients and aids may be added at any convenient point in the process. Inasmuch as these ingredients are soluble in the organic solvent, they may be added to the polymerization mixture prior to recovery of the product. Examples of suitable antioxidants include phosphited polyalkyl polyphenols and tri (mixed monononyl-dinonyl) phenyl phosphite. Examples of processing aids are mineral oils and the salts and esters of higher fatty acids. When desired, coloring agents may be added to produce colored resins. The coloring pigments of the prior art are suitable for this purpose.

The high impact plastic compositions prepared by the process of the invention have better physical properties such as impact resistance, hardness and tensile strength than similar products of the prior art. Additionally, by using the preferred rubbery polymers of the invention having low unsaturation such as the terpolymers of ethylene, propylene and 5-alkylidene-2-norbornene, even better physical properties may be obtained. The novel plastic composition of the invention comprises (A) a resinous polymer, which may be one or more homopolymers of the alkenyl aromatic monomers or one or more interpolymers of the alkenyl monomers and acrylic monomers, and (B) a graft interpolymer of (1) a rubbery interpolymer of ethylene, at least one alpha monoolefin containing 3–16 carbon atoms, and 5-alkylidene-2-norbornene, and (2) monomeric material which may be one or more alkenyl aromatic monomers or acrylic monomers, or mixtures thereof. The alkylidene group contains 1–8 carbon atoms, and the preferred species is 5-ethylidene-2-norbornene. High impact plastics prepared from terpolymers of ethylene, propylene and 5-ethylidene-2-norbornene have many unusual and unexpected properties. The preferred monomers for use in preparing the above products are styrene, or styrene and acrylonitrile. The novel plastic compositions may contain the ratios of components previously mentioned, and may be prepared by the process of the invention using the ratios of reactants previously mentioned.

The foregoing detailed description and the following specific examples are for purposes of illustration only, and are not intended as being limiting to the spirit or scope of the appended claims.

EXAMPLE I

This example illustrates the preparation of a rubber modified polystyrene by the process of the invention. The terpolymer was an interpolymer of ethylene, propylene, and 5-ethylidene-2-norbornene which contained chemically bound therein approximately equal weights of ethylene and propylene, and sufficient 5-ethylidene-2-norbornene to provide an unsaturation level of 8.7 carbon-to-carbon double bonds per 1000 carbon atoms. The Mooney value was 66 (ML–4).

5.5 grams of the rubbery terpolymer was dissolved in 49.5 grams of hexane and charged to a laboratory autoclave fitted with an agitator. Thereafter the autoclave was charged with 28.6 grams of chlorobenzene, 54.5 grams of styrene and 0.55 gram of dicumylperoxide. The temperature of the reaction mixture was raised to 115° C. to initiate the reaction. The reaction was continued at this temperature for 22 hours, at which time 98% by weight of the styrene had reacted.

The product was precipitated from the reaction mixture by addition of alcohol. The solid product was dewatered, washed in water to remove water soluble impurities, dried and tested. The resulting rubber modified polystyrene had a Rockwell hardness of 102 ("R" scale) as determined by ASTM D785–65, Procedure B.

A sample of the product was molded, and then aged for 66 hours at 120° C. No discoloration was observed. Three commercial high impact polystyrenes which contained a diene rubbery component were tested under the same conditions and discolored badly.

EXAMPLE II

This example illustrates the preparation of high impact styrene-acrylonitrile plastics by the process of the present invention using a variety of mixed solvent systems, rubbery polymers and amounts of rubbery polymers. All ratios and percentages mentioned in this example are calculated by weight, and the weights are given in grams.

The rubbery polymer was dissolved in solvent. The reaction vessel was charged with the solvent mixture and rubbery polymer, and the styrene and acrylonitrile monomers were charged in a weight ratio of styrene to acrylonitrile of 3:1. Benzoyl peroxide was added as the catalyst, and the temperature was raised to 70° C. to initiate the reaction. The reaction was continued at 70° C. over a 20 hour period with agitation. This resulted in substantially 100% by weight conversion of the styrene and acrylonitrile monomers to polymer for all runs with the exception of Run No. 2, where the conversion was 96% by weight.

The resulting high impact styrene-acrylonitrile plastic was precipitated from the reaction mixture by addition of isopropyl alcohol. The product precipitated in the form of small particles, which were collected, washed with water to remove water soluble impurities and dried. The plastic products were tested for tensile strength, Rockwell hardness ("R" scale), and Izod impact resistance. Conventional test procedures were used in each instance. The Rockwell hardness was determined by ASTM D785–65, Procedure B, the Izod impact resistance was determined by ASTM D256–56, Method A, and the tensile strength was determined by ASTM D638–61T. The data thus obtained are recorded in Table I.

TABLE I

| Run No. | Solvent composition | Rubber, grams | Rubber unsaturation, C=C/1,000 C | Rubber in plastic (wt. percent) | Styrene-acrylonitrile, grams (3/1 ratio) | Benzoyl peroxide, grams | Rockwell hardness ("R" scale) | Izod impact resistance ft. lbs./in. of notch | Tensile strength, p.s.i. |
|---|---|---|---|---|---|---|---|---|---|
| 1 | 170 g. toluene, 170 g. hexane | 15.0 | 12.9 | 10.4 | 130 | 1.30 | 104 | 6.30 | |
| 2 | 105 g. chlorobenzene, 205 g. hexane | 20.0 | 12.9 | 11.2 | 165 | 1.65 | 101 | 3.15 | |
| 3 | 175 g. benzene, 175 g. heptane | 20.0 | 12.9 | 10.8 | 165 | 1.65 | 101 | 3.07 | |
| 4 | 120 g. benzene, 105 g. hexane, 105 g. cyclohexane | 20.0 | 12.9 | 10.8 | 165 | 1.65 | 97 | 4.54 | |
| 5 | 170 g. benzene, 170 g. hexane | 9.0 | 9.8 | 5.1 | 164 | 1.64 | 117 | 0.92 | 8,700 |
| 6 | 170 g. benzene, 170 g. hexane | 15.0 | 9.8 | 10.4 | 130 | 1.30 | 105 | 2.84 | 7,540 |
| 7 | 170 g. benzene, 170 g. hexane | 20.0 | 9.8 | 15.0 | 112 | 1.12 | 95 | 10.8 | 6,540 |
| 8 | 175 g. toluene, 175 g. hexane | 20.0 | 9.8 | 10.8 | 165 | 1.65 | 106 | 4.62 | 7,100 |
| 9 | 175 g. toluene, 175 g. heptane | 20.0 | 9.8 | 10.8 | 165 | 1.65 | 106 | 6.41 | 7,700 |

It is apparent from the data in Table I that excellent high impact plastics are produced by the one-step process of the invention. Very satisfactory high impact plastics are produced when the procedure of this example is modified to susbtitute the other rubbers, monomers, catalysts and solvents mentioned herein for those appearing in Table I.

EXAMPLE III

This example presents data for the purpose of comparing the physical properties of the rubber modified plastics or the present invention with those ol the prior art.

Three of the best commercially available acrylonitrilebutadiene-styrene (ABS) high impact plastics were purchased which had rubber contents of 5.5%, 10.7% and 15.0% by weight, respectively. The rubber content in each instance was polybutadiene.

Three plastics were prepared by the general procedure of Example II which had rubber contents of 5.5%, 10.7% and 15.0% by weight, respectively. The rubber in each run was a terpolymer of ethylene, propylene and 5-ethylidene-2-norbornene.

The above six plastics were tested to determine the Rockwell hardness ("R" scale) and Izod impact resistance by the methods of Example II. The data thus obtained are compared in Table II. It is apparent from these data that the one step process of the invention produces plastics having better properties than the best commercially available products.

TABLE II

| Rubber content of plastics, weight percent | Rockwell hardness ("R" scale) | | Izod impact resistance, ft. lbs./inch of notch | |
|---|---|---|---|---|
| | Commercial plastics | Plastics of Example III | Commercial plastics | Plastics of Example III |
| 5.5 | 113 | 115 | 0.7 | 1.1 |
| 10.7 | 108 | 110 | 2.9 | 4.7 |
| 15.0 | 98 | 98 | 5.6 | 6.6 |

EXAMPLE IV

This example followed the general procedure of Example II except as noted. The rubber was a commercially available high cis-1,4-polybutadiene, the solvent was a mixture containing 60% by weight benzene and 40% by weight hexane, the initiator was azo-bisdiisobutyronitrile in an amount to provide 0.66 gram per 100 parts by weight of monomer, the concentration of the styrene and acrylonitrile monomers in the total reaction mixture was 33% by weight, the rubber content in the reactants and product was 8.9% by weight, and the reaction was at 70° C. for 16 hours.

The resulting plastic product was tested following ASTM D1706–61 for determining Shore D hardness, and the drop dart test for determining impact strength. The Shore D hardness was 76, and in the impact test, the sample withstood the impact energy of 160 inch pounds.

EXAMPLE V

This example followed the general procedure of Example II except as noted. The rubber was a commercially available polybutadiene having 35–45% trans-1,4-addition, 45–55% cis-1,4-addition, and a small amount of 1,2-addition, and amorphous material. The rubber content in the reactants and product was 9.3% by weight, the solvent was a mixture containing 50% by weight of benzene and 50% by weight of hexane, the concentration of the styrene and acrylonitrile monomers in the total reaction mixture was 28% by weight, and the initiator was 1.0 gram of a mixture of benzoyl peroxide and azo-bisdiisobutyronitrile in a weight ratio, respectively of 3:1.

The resulting plastic product was tested as in Example IV. The Shore D hardness was 75, and in the impact test, the sample withstood the impact energy of 160 inch pounds.

EXAMPLE VI

This example followed the general procedure of Example II except as noted. The rubber was commercial butyl rubber, the rubber content of the reactants and product was 10% by weight, the solvent was a mixture containing 52% by weight of benzene and 48% by weight of hexane, the concentration of the styrene and acrylonitrile monomers in the total reaction mixture was 25% by weight, and the initiator was 1.0 gram of benzoyl peroxide.

The resulting plastic product was tested as in Example IV. The Shore D hardness was 82 and in the impact test, the sample withstood the impact energy of 160 inch pounds.

EXAMPLE VII

Samples of a commercially available ABS plastic containing 15.0% by weight rubber (polybutadiene) and a plastic of the invention containing 15.0% by weight rubber (ethylene-propylene-5-ethylidene terpolymer) were aged for 60 hours at 120° C. The aged samples were tested to determine the Izod impact values.

The plastic of the invention had an Izod unnotched impact value of 36.4 ft. lbs./in. of notch prior to aging, and an unnotched impact value of 33.5 after aging. The commercial plastic had an Izod unnotched impact value of 32.8 ft. lbs./in. of notch prior to aging, and an unnotched impact value of 7.0 after aging. Thus, before aging the plastic of the invention had an impact resistance 11.0% greater than the commercial product, and 378% greater after aging.

EXAMPLE VIII

This example followed the general procedure of Example II except as noted. The elastomer was an interpolymer of ethylene, propylene and dicyclopentadiene containing an ethylene:propylene mole ratio of 58:42 and 3% by weight of dicyclopentadiene. The solvent was a mixture containing 48% by weight of benzene and 52% by weight of hexane, and the initiator was benzoyl peroxide in an amount to provide 1.00 part per one hundred parts by weight of monomers. The concentration of the styrene and acrylonitrile monomers in the reaction mixture was 23%. The conversion of the monomers was 86% after 16 hours at 70° C. and the resulting plastic contained 16% of elastomer by weight.

The plastic product was tested as in Example IV. The Shore D hardness was 77 and the sample shattered under a falling dart impact of 160 inch pounds.

An ethylene-propylene-dicyclopentadiene interpolymer, of the composition described above, was dissolved in 182 grams of hexane in an amount sufficient to make a 9% solution by weight. The solution was placed in a vessel, 0.7 gram of benzoyl peroxide was added and the vessel pressurized to 50 p.s.i. with oxygen. The elastomer was oxidized at a temperature of 70° C. After 4 hours, 200 g. of benzene, 133 g. of styrene and acrylonitrile monomers, and 0.7 g. of benzoyl peroxide was added to the vessel and the temperature was maintained at 70° C. for 16 hours. The resulting plastic contained 11% elastomer.

The sample was tested as in Example IV. The Shore D hardness was 73 and the sample withstood a falling dart impact of 160 inch pounds.

EXAMPLE IX

In this example, a high impact plastic is prepared from an oxidized elastomer according to the procedure in Example VIII, with the exception of substituting a copolymer of ethylene and propylene containing 58 mole percent of ethylene, for the ethylene-propylene-dicyclopentadiene interpolymer. Also, the ethylene-propylene copolymer is added in an amount so that the resulting high impact plastic contains 22% by weight thereof.

The high impact plastic product is tested by the methods given in Example II and Example IV. The Rockwell hardness ("R" scale) is 100 and the sample is capable of withstanding a falling dart impact of 160 inch pounds.

EXAMPLE X

A series of solutions were prepared that contained 14.4 g. of an ethylene-propylene-dicyclopentadiene interpolymer, 186 g. of hexane, 200 g. of benzene, and 133 g. of styrene and acrylonitrile monomers. Different amounts of benzoyl peroxide and/or azo-bisdiisobutyronitrile as a catalyst were added to each of the solutions, as shown in Table III.

The above prepared solutions were polymerized at a temperature of 70° C. for 16 hours. The resulting plastic products were recovered and tested in accordance with Example IV. The data thus obtained are recorded below in Table III. The degree of graft refers to the parts by weight of styrene and acrylonitrile that was grafted on each 100 parts by weight of the interpolymer.

TABLE III

| Benzoyl peroxide, g. | Axo-bisdi-isobutyro-nitrile, g. | Degree of graft | Shore D hardness | Falling dart impact (160 in. lbs.) |
|---|---|---|---|---|
| 1.33 | None | 31 | 82 | Very good. |
| 1.06 | 0.17 | 19 | 80 | Shattered. |
| 0.53 | 0.53 | 16 | 81 | Do. |
| 0.27 | 0.70 | 11 | 81 | Do. |

EXAMPLE XI

Various terpolymers were used in preparing a series of high impact plastics. With the exception of the types of the elastomers that were used, the general procedure of Example II was followed. The terpolymers of this example, which were substituted for the terpolymers of Example II, had a mole ratio of chemically bound ethylene to propylene of about 60:40, and contained a chemically bound polyene in the following amounts in each instance:

(1) Dicyclopentadiene in an amount to provide 6.0 carbon-to-carbon double bonds per 100 carbon atoms. The plastic contained 9.9% by weight of this terpolymer.

(2) 5-(3,5-dimethyl-4-hexenyl)-2-norbornene in an amount to provide 4.0 carbon-to-carbon double bonds per 1000 carbon atoms. The plastic contained 8.8% by weight of this terpolymer.

(3) 5-butylene-2-norbornene in an amount to provide 3.4 carbon-to-carbon double bonds per 1000 carbon atoms. The plastic contained 8.7% by weight of this terpolymer.

(4) 1,4-hexadiene in an amount to provide about 3 carbon-to-carbon double bonds per 1000 carbon atoms. The plastic contained 8.0% by weight of this terpolymer.

(5) 5-methylene-2-norbornene in an amount to provide about 3 carbon-to-carbon double bonds per 1000 carbon atoms. The plastic contained 8.8% by weight of this terpolymer.

(6) 5-ethylidene-2-norbornene in an amount to provide 3.7 carbon-to-carbon double bonds per 1000 carbon atoms. The plastic contained 7.9% of this terpolymer.

The resulting plastic products were recovered and tested in accordance with Example IV. Only the plastics prepared from the terpolymers containing 5-methylene-2-norbornene and 5-ethylidene-2-norbornene as a monomer withstood the falling dart test without shattering.

What is claimed is:

1. A process for preparing rubber modified plastics comprising interpolymerizing in an organic solvent and in the presence of a free radical catalyst about 1–50 parts by weight of a rubbery polymer of ethylene, at least one monoolefin containing 3–16 carbon atoms and at least one polyene for each 99–50 parts by weight of monomeric material selected from the group consisting of alkenyl aromatic monomers, acrylic monomers, and mixtures thereof, the organic solvent being a solvent for the rubbery polymer and selected from the group consisting of (A) an aromatic solvent selected from the group consisting of benzene, alkyl substituted benzenes wherein the alkyl group in each instance contains 1–4 carbon atoms, naphthalene, alkyl substituted naphthalenes wherein the alkyl group in each instance contains 1–4 carbon atoms, (B) a mixture of said aromatic solvent and paraffinic or cycloparaffinic hydrocarbons containing from 5–15 carbon atoms, and (C) halogenated derivatives of (A) and (B), the alkenyl aromatic monomer being selected from the group consisting of alkenyl aromatic hydrocarbons having 8–20 carbon atoms and the halogenated derivatives thereof, and the acrylic monomer having the general formula

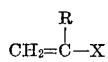

wherein R is selected from the group consisting of hydrogen and alkyl groups having 1–5 carbon atoms, and X is selected from the group consisting of

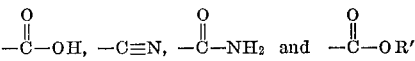

wherein R' is an alkyl group containing 1–9 carbon atoms.

2. The process of claim 1 wherein about 4–25 parts by weight of the rubbery polymer are present for each 100 parts by weight of the monomeric material.

3. The process of claim 1 wherein the organic solvent is selected from the group consisting of benzene, toluene, mixtures of benzene with at least one hydrocarbon selected from the group consisting of paraffins and cycloparaffins containing six through eight carbon atoms, and mixtures of toluene with at least one hydrocarbon selected from the group consisting of paraffin and cycloparaffin hydrocarbons containing six through eight carbon atoms.

4. The process of claim 1 wherein the free radical polymerization catalyst is selected from the group consisting of organic peroxides and mixtures of an organic peroxide and azo-bisdiisobutyronitrile.

5. The process of claim 1 wherein the rubbery polymer is a terpolymer of ethylene, at least one alpha monoolefin containing 3–16 carbon atoms, and 5-alkylidene-2-norbornene.

6. The process of claim 5 wherein the 5-alkylidene-2-norbornene is 5-ethylidene-2-norbornene.

7. The process of claim 1 wherein the monomeric material is styrene.

8. The process of claim 7 wherein the rubbery polymer is a terpolymer of ethylene, at least one alpha monoolefin containing 3–16 carbon atoms, and 5-alkylidene-2-norbornene.

9. The process of claim 8 wherein the 5-alkylidene-2-norbornene is 5-ethylidene-2-norbornene.

10. The process of claim 9 wherein the organic solvent is selected from the group consisting of benzene, toluene, mixtures of benzene with at least one hydrocarbon selected from the group consisting of paraffins and cycloparaffins containing six through eight carbon atoms, and mixtures of toluene with at least one hydrocarbon selected from the group consisting of paraffin and cycloparaffin hydrocarbons containing six through eight carbon atoms.

11. The process of claim 10 wherein the free radical catalyst comprises an organic peroxide and the terpolymer is present in an amount of 4–25 parts by weight for each 96–75 parts by weight of styrene.

12. The process of claim 1 wherein the monomeric material is a mixture of styrene and acrylonitrile, and the ratio of styrene to acrylonitrile is between 2:1 and 4:1.

13. The method of claim 12 wherein the rubbery polymer is an interpolymer of ethylene, at least one alpha monoolefin containing 3–16 carbon atoms, and 5-alkylidene-2-norbornene.

14. The process of claim 13 wherein the rubbery polymer is a terpolymer of ethylene, propylene and 5-ethylidene-2-norbornene.

15. The process of claim 14 wherein the solvent is selected from the group consisting of benzene, toluene, mixtures of benzene with at least one hydrocarbon selected from the group consisting of paraffins and cycloparaffins containing six through eight carbon atoms, and mixtures of toluene with at least one hydrocarbon selected from the group consisting of paraffins and cycloparaffin hydrocarbons containing six through eight carbon atoms.

16. The process of claim 15 wherein the free radical catalyst comprises an organic peroixde and the terpolymer is present in an amount of 4–25 parts by weight for each 96–75 parts by weight of styrene and acrylonitrile.

17. The process as claimed in claim 1 in which the rubbery polymer, prior to interpolymerization, has 2–25 carbon to carbon double bonds per 1000 carbon atoms.

18. The process as claimed in claim 1 in which the rubbery polymer, prior to interpolymerization, has 3–16 carbon to carbon double bonds per 1000 carbon atoms.

19. The process as claimed in claim 1 in which the solvent comprises a mixture of an aromatic solvent and a paraffinic of cycloparaffinic hydrocarbon solvent in the ratio of 40:60 to 60:40 percent by weight aromatic to paraffinic or cycloparaffinic solvent.

20. The process as claimed in claim 1 in which the ratio of grafted monomeric material to rubbery polymer is within the range of 1:4 to 4:1.

References Cited

UNITED STATES PATENTS

| | | | |
|---|---|---|---|
| 3,151,173 | 9/1964 | Nyce | 260—666 |
| 3,271,477 | 9/1966 | Kresge | 260—878 |
| 3,311,675 | 3/1967 | Doak et al. | 260—880 |
| 3,432,577 | 3/1969 | Serniuk | 260—879 |
| 3,435,096 | 3/1969 | Limbert et al. | 260—878 |
| 3,449,471 | 6/1969 | Weitzel et al. | 260—880 |
| 3,483,273 | 12/1969 | Prucnal et al. | 260—878 |
| 3,489,822 | 1/1970 | Witt et al. | 260—878 |

FOREIGN PATENTS 1,009,719  11/1965  Great Britain.

MURRAY TILLMAN, Primary Examiner

M. J. TULLY, Assistant Examiner

U.S. Cl. X.R.

260—879, 880